Dec. 20, 1966　　　E. W. KONRAD ETAL　　　3,292,454
MULTIPLE SPEED RATIO POWER TRANSMISSION
MECHANISM FOR MOTOR VEHICLES
Filed July 22, 1963　　　　　　　　　3 Sheets-Sheet 1
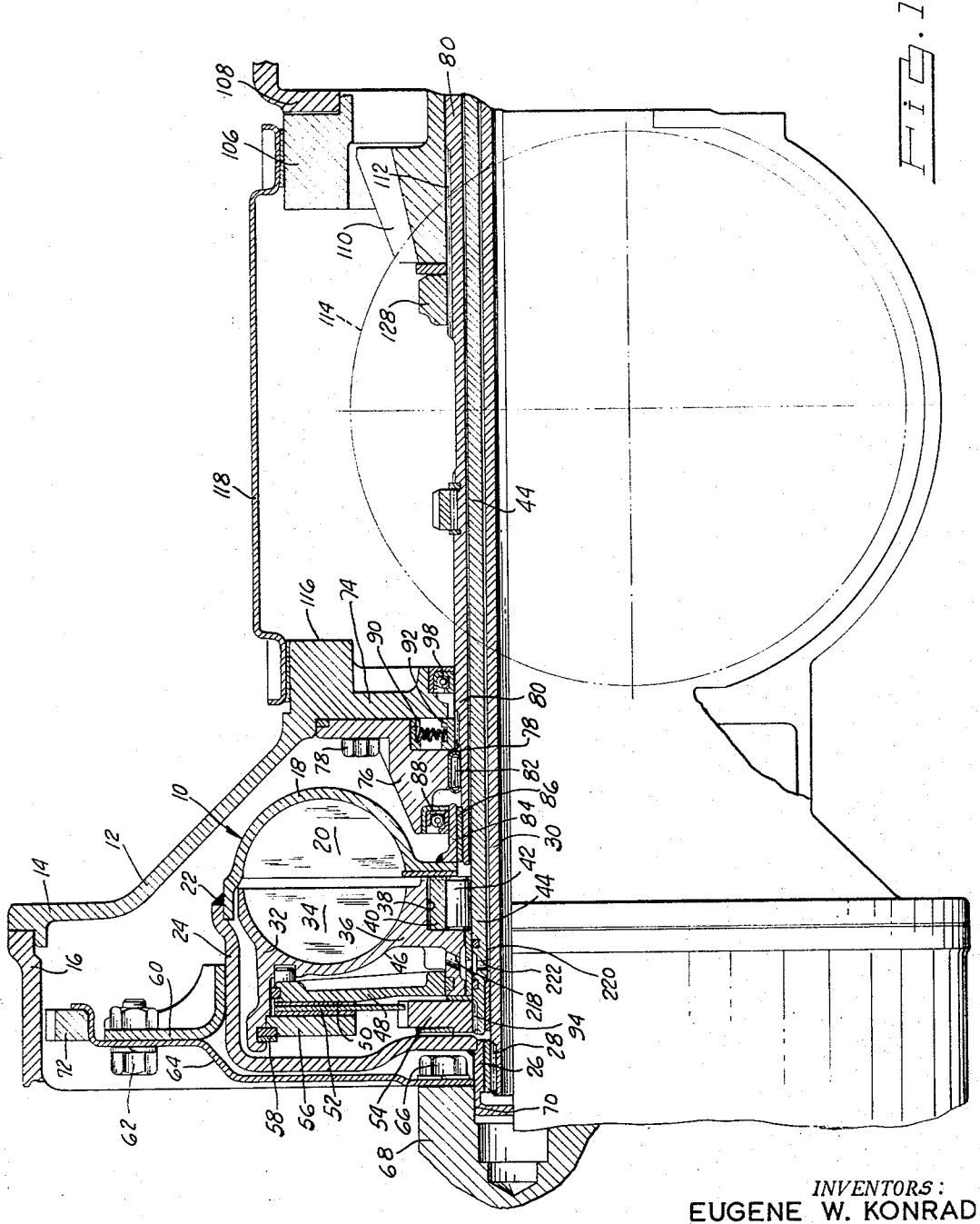
INVENTORS:
EUGENE W. KONRAD
ROBERT P. ZUNDEL
BY
ATTORNEYS

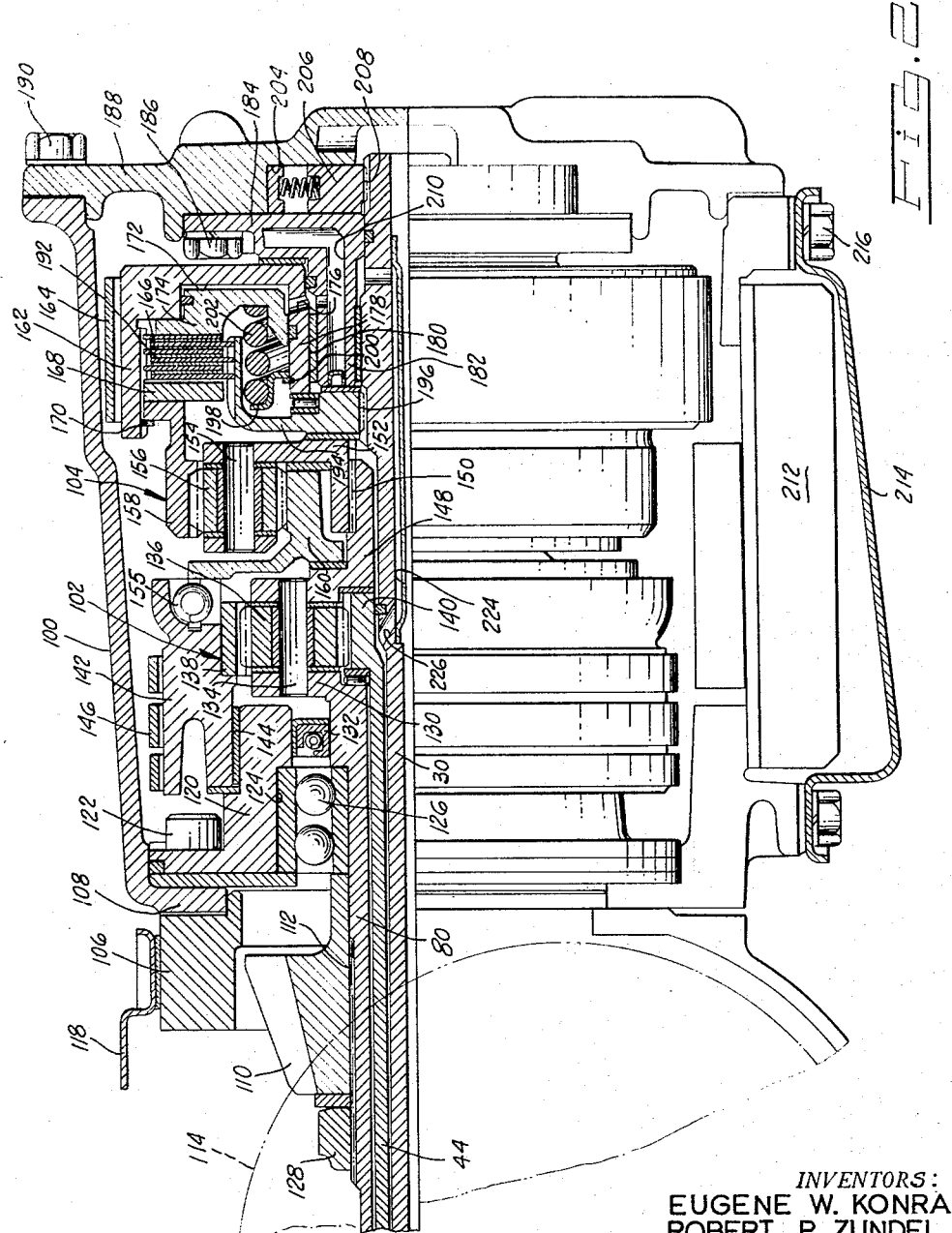

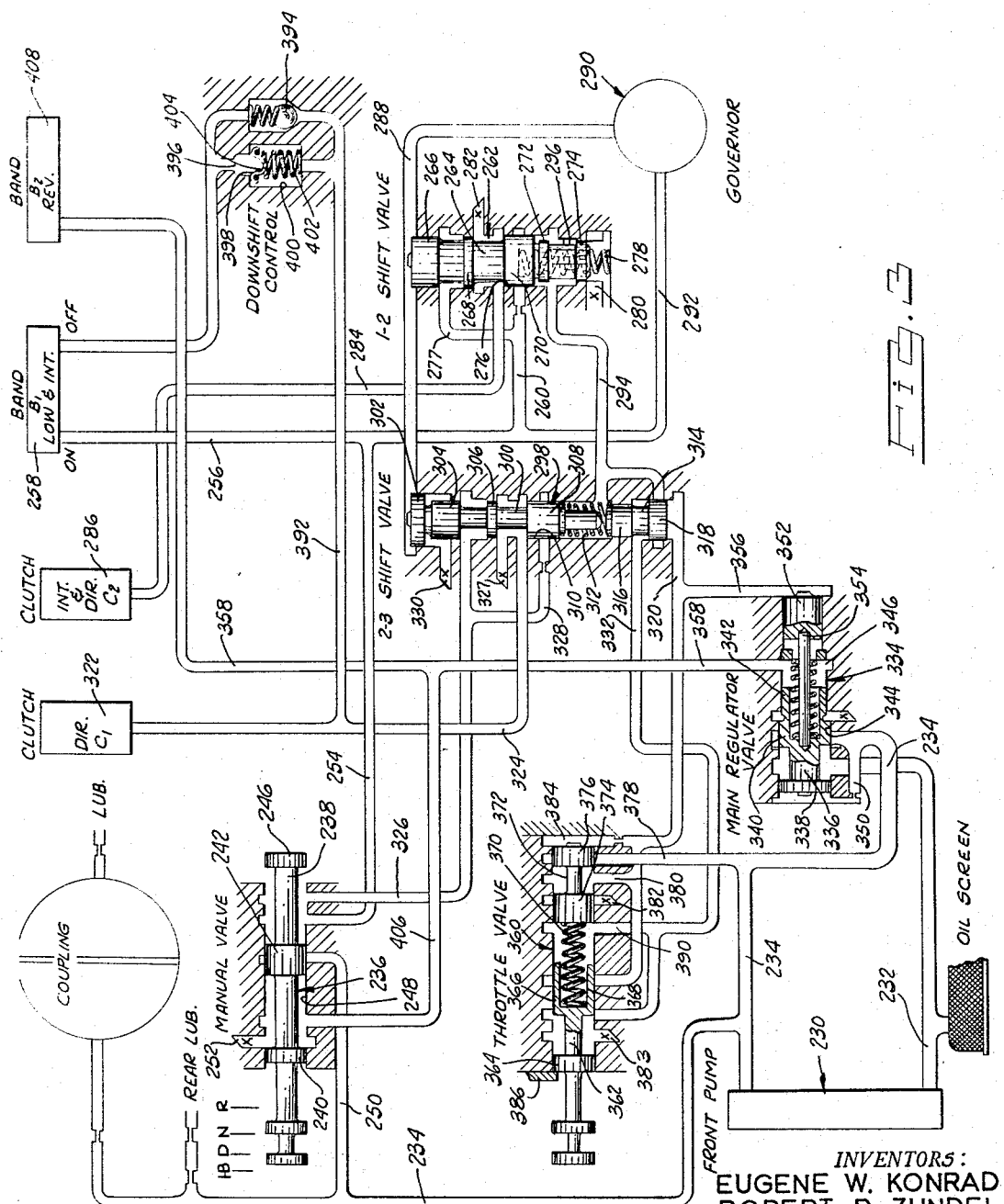

3,292,454
MULTIPLE SPEED RATIO POWER TRANSMISSION MECHANISM FOR MOTOR VEHICLES

Eugene W. Konrad, Northville, and Robert P. Zundel, Wayne, Mich., assignors to Ford Motor Company, Dearborn, Mich., a corporation of Delaware
Filed July 22, 1963, Ser. No. 296,670
6 Claims. (Cl. 74—688)

Our invention relates generally to a multiple speed ratio power transmission mechanism having a hydrokinetic unit and two simple planetary gear units that act in combination to provide plural torque delivery paths between a driving member and a driven member. More particularly, our invention relates to improvements in a multiple speed ratio power transmission mechanism and automatic control valve system for an automotive vehicle driveline.

According to a principal feature of our invention, we have provided a hydrokinetic fluid coupling and a gear system together with a clutch and brake arrangement for providing three forward driving speed ratios.

The power flow path that exists during operation in the first speed ratio is defined in part by the hydrokinetic unit with all of the driving torque being delivered through it. During operation in the second speed ratio, however, the power flow path is entirely mechanical and the hydrokinetic unit is bypassed thereby providing maximum efficiency during the acceleration period. Cruising operation in the third forward driving speed ratio is obtained by establishing a split torque delivery path between the driving member and the driven member, one path being defined in part by the hydrokinetic unit to distribute a portion of the driving torque and the other path being wholly mechanical.

According to another feature of our invention, we have provided a simplified automatic control valve system for actuating in sequence the clutch and brake members to establish the various driving speed ratios and condition the mechanism for optimum performance under any given driving condition. The valve system includes a fluid pressure source such as an engine driven positive displacement pump. A simplified main regulator valve is used for maintaining an effective pump output pressure that is distributed to the control valve circuit. Pressure is distributed selectively to the various clutches and brakes of the mechanism by means of two shift valves that respond to both a governor pressure signal that is proportional in magnitude to the vehicle speed and a pressure signal that is related functionally to engine torque demand. The engine torque demand signal is obtained by a throttle valve, and provision is made for obtaining a so-called detent resistance or feel as the throttle valve structure is advanced to a position corresponding to maximum torque demand. The provision of a valve system of this type is another object of our invention.

It is another object of our invention to provide a simplified valve arrangement for controlling the rate of application and release of one of the brake bands for the mechanism with respect to the rate of application of release of an associated clutch.

Other objects and features of our invention will become apparent from the following description and the accompanying drawings, wherein:

FIGURE 1 shows in longitudinal cross-sectional form one portion of our power transmission mechanism;

FIGURE 2 shows in longitudinal cross-sectional form another portion of the mechanism of our invention; and FIGURE 3 shows a control valve system in schematic form for controlling the application and release of the clutch and brake elements for the mechanism of FIGURES 1 and 2.

Referring first to FIGURE 1, the hydrokinetic fluid coupling is shown at 10. It is situated within a housing portion 12 which is flanged at 14 to provide a suitable connection with one end of a clutch housing portion 16.

The hydrokinetic fluid coupling 10 includes an impeller shell 18 which is formed with a toroidal shape. Received within the shell 18 is a series of impeller blades 20 which establish radial outflow passages in a conventional fashion. The outer periphery of shell 18 is welded at 22 to the outer periphery of a second shell part 24. This shell part extends radially inwardly and is secured to a pilot hub 26 by means of welding as indicated. The hub 26 in turn is splined at 28 to a central torque delivery shaft 30.

The hydrokinetic unit 10 includes also a turbine having a turbine shroud 32 within which are situated turbine blades 34. These blades define radial inflow passages that are in fluid flow relationship with respect to the passages defined by the blades 20.

The hub 36 for the turbine is recessed as shown at 38 to accommodate an overrunning coupling race 40. This race is cammed to permit a camming action with overrunning coupling rollers 42. These rollers act upon sleeve shaft 44 and establish a one-way driving connection between race 40 and the shaft 44.

Shroud 32 defines an annular cylinder 46 within which is situated an annular piston 48. Piston 48 includes a friction surface 50 which is situated adjacent a clutch disc 52 which in turn is splined to an externally splined clutch disc hub 54.

A clutch reaction disc 56 is keyed to the outer peripheral margin of the cylinder 46 and held axially fast with respect to shroud 32 by a snap ring 58. As fluid pressure is admitted to the working chamber defined by the cylinder 46 and the piston 48, disc 52 will be connected drivably to the turbine.

Shell part 24 has secured thereto a flanged bracket 60. It is bolted by means of bolts 62 to the periphery of a drive plate 64. The inner margin of drive plate 64 is bolted by a bolt 66 to the crankshaft 68 of an internal combustion vehicle engine. Crankshaft 68 is provided with a pilot opening 70 which receives the hub 26.

The outer margin of the plate 64 carries an engine starter ring gear 72 in the usual fashion.

Housing portion 12 includes an inwardly extending end wall 74. An adaptor 76 is bolted by means of bolts 78 to one side of the wall 74 and provided with an opening 78. A power output shaft 80 is received through the opening 78 and journalled therein by a bearing 82. The hub of shell 18 is welded to a support sleeve 84 which in turn is journalled by means of a bushing 86 upon the shaft 80.

A fluid seal 88 is received within a seal opening in adaptor 76 which cooperates with the sleeve 84. Adaptor 76 defines also a pump chamber 90 within which are situated pump elements 92. These elements may form a part of a vehicle speed governor system that establishes a pressure signal that is utilized by a control valve system to initiate speed ratio changes. The valve system will be described subsequently.

Hub 54 is splined at 94 to a sleeve shaft 44 which extends concentrically over shaft 30 and within shaft 80. A fluid seal 98 is situated between shaft 80 and the wall 74.

The transmission mechanism includes also a second housing portion 100, as best indicated in FIGURE 2. This housing portion encloses two simple planetary gear units identified generally by reference characters 102 and 104. It encloses also clutch and brake structure for controlling the relative motion of the elements of the gear units 102 and 104.

Housing portion 12 includes a boss 106 to which the housing portion 100 is bolted. A flange 108 is formed on the housing portion 100 for this purpose.

Housing portion 12 is adapted to enclose a power output pinion 110 which is splined at 112 to the power output shaft 80. In encloses also a ring gear schematically represented by the addenum circle 114. This gear engages the power output pinion 110 and forms a part of a differential mechanism that distributes the torque of the ring gear to each of two axle shafts. These in turn are connected to the traction wheels through a suitable drive line arrangement.

The upper portion of the housing portion 12 is formed with an access opening 116 over which is positioned a cover plate 118.

A bearing adaptor 120 is secured by bolts 122 to the flange 108. It is formed with a bearing opening 124 within which is positioned a bearing 126. This rotatably supports the power output shaft 80 and the power output pinion 110. The inner race of the bearing 126 engages the power output pinion 110, the latter being clamped against the bearing 126 by a clamping screw 128.

Shaft 80 is connected to the carrier 130 of the planetary gear unit 102. A suitable seal 132 is situated between the carrier 130 and the surrounding adaptor 120.

Carrier 130 includes a plurality of pinion shafts 134 which rotatably support pinions 136. These pinions engage ring gear 138 and a sun gear 140. Ring gear 138 is secured to a brake drum 142 which is journalled by means of a bushing 144 upon an adaptor 120. A multiple wrap brake band 146, which surrounds the drum 142, may be applied and released selectively by a fluid pressure operated servo of known construction. This servo may include a servo cylinder within which is positioned a servo piston which defines in part two opposed fluid working chambers. When both chambers are pressurized, the brake assumes a released condition. On the other hand, if one of the chambers is exhausted, the remaining pressure on the other side of the piston causes the piston to assume a brake applying position.

Carrier 130 includes an extension 148 which is splined at 150 to a carrier 152 or a second planetary gear unit 104. Carrier 152 includes planet pinion shafts 154 upon which are journalled pinions 156. These pinions engage a ring gear 158 and a sun gear 160. Sun gear 160 in turn is connected drivably to brake drum 142 by means of a yieldable connection comprising damper springs 155.

Ring gear 158 is keyed or splined to an internally splined brake drum 162. A reverse brake band 164 surrounds the drum 162. Drum 162 carries externally splined clutch discs 166 on its splined inner periphery. Splined also to the inner periphery of drum 162 is an externally splined clutch reaction disc 168. The disc assembly is held axially fast by means of a snap ring 170.

Drum 162 defines an annular cylinder 172 within which is positioned an annular piston 174. This piston and cylinder cooperate to define a pressure chamber which is in fluid communication with a pressure feed port 176.

The hub of drum 162 defines a sleeve extension 178 which is journalled by means of a bushing 180 upon a stationary sleeve extension 182 of an adaptor 184. This adaptor is secured by means of bolts 186 to an end wall 188 for the transmission housing. The end wall is bolted by bolts 190 to the end of housing portion 100.

Internally splined clutch discs 192 are carried by an externally splined clutch member 194 which in turn is splined at 196 to shaft 30.

Discs 166 and 192 are situated in interdigital relationship. As pressure is admitted to the right hand side of piston 174, discs 166 and 192 establish a frictional driving connection between drum 162 and shaft 30.

A spring seat 198 is held fast by means of a snap ring 200 on the extension 178. A piston return spring 202 is situated between the seat 198 and piston 174.

Wall 88 includes a pump chamber 204 within which are situated pump elements 206. A driving connection between the pump and the shaft 30 is provided by a spline connection 208.

Brake band 164 can be applied and released by means of a suitable fluid pressure operated servo. The servos for the brakes and the two clutches are supplied by means of fluid pressure feed passages. The feed passage for the cylinder 172 includes a port 176 which communicates with a passage 210 formed in the adaptor 184. This passage in turn communicates with valve structure that may be located in the lower portion of the transmission housing. The valve body is designated generally by reference character 212 in FIGURE 2 and is located within a transmission sump that is defined in part by an oil pan 214 secured to the lower portion of the housing portion 10 by bolts 216.

The feed passage for the cylinders 46 includes a port 218 formed in the hub of the turbine shroud 32. This port communicates with an annular passage 220 defined by the concentric shafts 30 and 44. A suitable port 222 is provided for this purpose.

Passage 220 communicates with an annular passage that is defined in part by a flow distributor element 224 formed in a central opening in the right hand end of shaft 30 as viewed in FIGURE 2. A port 226 establishes communication between the passage 220 and the passage surrounding insert 224.

To establish first speed ratio operation, it merely is necessary to engage brake 146. This anchors ring gear 138 and sun gear 160. Turbine torque is developed by the hydrokinetic coupling 10 and is distributed through the overrunning coupling shown in part at 42 and through shaft 44 to the sun gear 140. Ring gear 138 acts as a reaction member and the carrier 130 then is driven at a reduced speed. The motion of the carrier 130 is distributed to the power output pinion 110 through the shaft 80.

To establish intermediate speed ratio operation, the brake band 146 remains applied and the clutch disc assemblies 166 and 192 are applied. Thus engine torque is distributed directly through shaft 30 and through the applied clutch to the ring gear 158. Sun gear 160 acts as a reaction member since it is anchored by the brake band 146. Carrier 152 then is driven at a reduced speed, and its motion is transferred through carrier 130 to the shaft 80 and hence to the power output pinion 110. The overrunning coupling shown in part at 42 overruns under these conditions. This intermediate speed ratio power flow path is wholly mechanical and the coupling 10 is ineffective. In contrast, the power flow path that exists during low speed ratio operation includes the coupling and all the engine torque is distributed through it to establish a cushioning action during acceleration from a standing start.

To establish high speed ratio operation, brake band 146 is released and the clutch shown in part at 52 is applied. This establishes a split power flow path with a portion of the torque being distributed directly from the engine through shaft 30 to the ring gear 158. The balance of power is distributed, in a regenerative fashion, through the hydrokinetic unit from the clutch shown in part at 52, which receives feedback torque from the shaft 44. Reaction torque is distributed to shaft 44 from the sun gear 140. This portion of the path is hydrokinetic whereas the other portion is wholly mechanical. The gear units 102 and 104 thus assume a substantially locked up condition and the elements thereof rotate in unison.

To establish reverse drive operation, it merely is necessary to apply brake band 164. Turbine torque then is delivered to the overrunning coupling shown in part at 42 and through shaft 44 to the sun gear 140. Since the power output shaft tends to retard movement of carrier 130, the ring gear tends to rotate in a backward direction. The torque of the sun gear 160 overcomes the forward driving torque applied to the carrier 130 and the compinion carrier 152 to cause the power output shaft 80 to rotate in a backward direction with the ring gear 158 acting as a reaction member.

Referring next to FIGURE 3, we have illustrated in schematic form an automatic control valve system for controlling the operation of the clutches and brakes of the mechanism of FIGURES 1 and 2. The pump shown in part at 204 and 206 is identified generally in FIGURE 3 by reference character 230. It acts as a main pressure source for the control valve system and its intake side communicates through a supply passage 232 with the oil sump of which oil pan 214 forms a part.

A high pressure control pressure passage 234 communicates with the discharge side of the pump 230. This passage in turn communicates with a manual valve identified generally by reference character 236. The manual valve includes a valve spool 238 having spaced valve lands 240, 242 and 246. Spool 238 is slidably situated within a valve chamber 248 and can be moved to any one of four operating positions that are identified in FIGURE 3 by the symbols HB, D, N and R. This adjustment can be made manually by the vehicle operator by means of a suitable driver operated linkage.

Passage 234 communicates with valve chamber 248 through a branch passage 250. When the spool 238 assumes the position shown, branch passage 250 is blocked by land 242. Opening 248 communicates with the exhaust region through either end. The valve bodies within which the opening 248 is formed is shown in FIGURE 2 at 212. When the spool 238 assumes the position shown, which is the neutral position, land 240 blocks one end of the opening 248. The annular space situated between the lands 242 and 240 communicates with an exhaust port 252. Furthermore, the land 248 establishes communication between the exhaust region and the other end of the opening 248.

If the spool 238 is shifted to the drive range position D, land 246 blocks the right hand end of the opening 248. Furthermore, land 242 uncovers passage 250. Control pressure from passage 250 then will be distributed to a passage 254 which communicates with a passage 256 extending to the apply side of a brake band servo 258. This servo applies and releases brake band 146. As previously explained, band 146 is applied during low speed ratio operation.

Control pressure passage 256 communicates also with a branch passage 260 which in turn communicates with a 1–2 shift valve identified generally by reference character 262. The valve includes a valve spool 264 having multiple valve lands 266, 268, 270, 272 and 274. Valve spool 264 is slidably situated within a valve chamber 276.

When the valve spool 264 assumes the position shown, land 250 blocks passage 260. Furthermore, the control pressure in passage 260 is distributed to the annular space between lands 266 and 268 through a branch passage 276. The diameter of land 266 is slightly greater than the diameter of land 268. Valve spool 264 thus is urged in an upward direction by the resulting pressure force. The valve spool 264 is urged upwardly also by a valve spring 278 which is received within a circular spring pocket formed in the lower end of the spool 264. Spring 278 rests upon one end of the valve chamber 276 which is formed in the valve body. The lower end of the valve chamber 276 is exhausted through exhaust port 280.

When spool 264 assumes the position shown, the annular space between lands 268 and 270 is exhausted through an exhaust port 282. This then causes passage 284 to be exhausted, the passage 284 communicating with the valve chamber 276 adjacent valve land 270. Passage 284 in turn communicates with the intermediate and direct clutch servo 286. This servo applies and releases the multiple disc clutch assembly shown at 166 and 192.

Governor pressure, which is a measure of the speed of the vehicle, is distributed to the upper end of land 266 through a governor pressure passage 288. This passage communicates with a governor valve assembly 290 which may be connected drivably to the power output shaft. Control pressure is supplied to the governor valve assembly 290 through a pressure feed passage 292 which communicates with control pressure passage 254. Reduced throttle pressure is distributed to chamber 276 through a pressure passage 294. This passage communicates with the chamber 276 at a point intermediate valve lands 274 and 270. The reduced throttle pressure thus tends to urge the valve spool 264 upwardly.

For any given magnitude of the reduced throttle pressure in passage 294, the governor pressure in passage 288 will cause the valve spool 264 to shift downwardly when a predetermined vehicle speed is achieved. This will cause land 266 to block passage 276. At the same time the differential area defined by lands 266 and 268 is exhausted through the exhaust port 282, thereby introducing a so-called hysteresis feature. Thus the valve spool 264 will return to the upper position only after the governor pressure in passage 288 is reduced to a value less than the value at which the shifting movement was initiated for any given magnitude of the pressure in passage 294.

Upon movement of the spool 264 in a downward direction, land 272 sealingly engages a reduced diameter portion 296 thereby interrupting communication between passage 294 and the annular space between lands 272 and 274. This same annular space, however, is exhausted through exhaust port 280. Thus the net effective differential area upon which the pressure in passage 294 acts is reduced in magnitude thereby augmenting the hysteresis feature described earlier.

It thus will be seen that upon shifting movement of the 1–2 shift valve spool 264, passage 284 will become pressurized thereby engaging the intermediate speed multiple disc clutch assembly. The brake band 146 continues to be applied, however, so that sun gear 160 may act as a reaction member. The transmission mechanism then is conditioned for intermediate speed ratio operation.

Upon a continued increase in vehicle speed during the acceleration period, an upshift from the intermediate speed ratio to the direct drive ratio will occur. This is accomplished by the 2–3 shift valve identified generally in FIGURE 3 by reference character 298. This valve includes a valve spool 300 having spaced annular valve lands 302, 304, 306 and 308. These lands are slidably situated within cooperating internal valve lands formed in a valve chamber 310, which is located in the valve body with the other elements of the valve system.

The valve spool is urged upwardly as viewed in FIGURE 3 by a valve spring 312. The lower end of the spring 312 acts upon the upper end of a double end valve spool 314, the individual lands of which are identified by reference characters 316 and 318. The diameter of land 318 is slightly larger than the diameter of land 316. Throttle pressure is distributed to the lower end of land 318 through a throttle pressure passage 320. The magnitude of the pressure in passage 320 is reduced by a value that depends upon the calibration of spring 310 and the reduced pressure then is made available to passage 294. The reduced pressure in passage 294 acts upon the lower end of the valve spool 308 in the region of this valve spring 312 to urge the valve spool 300 upwardly as viewed in FIGURE 3. Governor pressure passage 288 communicates with the upper end of land 302 and creates a governor pressure force that tends to shift the valve spool 300 downwardly, as viewed in FIGURE 3.

The direct drive clutch servo for the clutch shown in part at 50 is identified in FIGURE 3 by reference character 322. It communicates with the valve chamber 310 through a passage 324. Communication is established with chamber 310 at a location between lands 306 and 308. When the spool 300 assumes the position shown, passage 324 is exhausted through an exhaust port 326.

When the manual valve spool 238 assumes the drive position D, land 246 closes the right hand end of the chamber 248. This causes control pressure to be distributed from passage 252 to another passage 328 which also communicates with chamber 248. Passage 326 in turn communicates with chamber 310 at a location intermediate lands 304 and 306. When the spool 300 assumes the position shown, the pressure in passage 326 tends to urge the spool 300 upwardly by reason of the differential area between lands 304 and 306. If the valve spool 300 assumes a downward position, however, passage 326 is blocked and the annular space between lands 304 and 306 is exhausted through the exhaust port 327. This introduces a hysteresis feature which will delay a 2–3 upshift. We contemplate that a throttle setting of approximately one-third wide open throttle will be required before a 2–3 shift can be accomplished. This differential area between lands 304 and 306 introduces a hysteresis characteristic similar to that on the 1–2 shift valve.

As the spool 300 is shifted downwardly, passage 324 communicates directly with a branch passage 328 which in turn communicates directly with passage 326. Thus passage 324 and the direct drive clutch servo 322 become pressurized.

The diameter of land 302 is made sufficiently large to provide a proper shift point. In the embodiment shown, it is larger than the diameter of land 304. This makes it necessary, therefore, to evacuate fluid that may exist in the annular space surrounding land 304. This is done by introducing an exhaust port 330. If desired, a valve spring can be provided at this location, so that it will act on the lower end of land 302 to urge the spool 300 upwardly.

The reducer valve spool 314 functions to establish a delayed upshift by reducing the magnitude of the throttle pressure in passage 320 before it acts upon the shift valve. When the throttle pressure is low, the amount of the reduction in a preferred embodiment of our invention may be approximately 38 p.s.i. At maximum line pressure, which may be approximately 100 p.s.i. in a preferred embodiment of our invention, the reduction is approximately 14 p.s.i. A differential area on the valve spool 314 is desired in order to provide the proper kickdown point and maximum throttle upshift point.

Kickdown pressure is distributed to the annular space between lands 318 and 316 through a kickdown pressure passage 332. A delay in the 2–3 upshift, as well as the 1–2 shift, is made necessary in the mechanism of FIGURES 1 and 2 because of the mechanical lock-up in direct and intermediate. If a delay were not introduced into the shift valve system, a decrease of engine speed below a value of approximately 1,000 r.p.m. might cause the engine to lug by reason the mechanical power flow path.

It will be observed that the 1–2 shift valve uses the same reduced throttle pressure that is used by the 2–3 shaft valve. With this arrangement, it is impossible to initiate a part throttle 2–1 downshift until 3–2 downshift has been completed. Thus the transmission will be forced to assume an intermediate speed ratio condition before the lower speed ratio is achieved. After the 1–2 upshift has been completed, the effective area upon which the reduced throttle pressure acts upon the 1–2 shift valve is reduced. This differential area is calibrated to give the desired 2–1 part throttle shift point. It is unnecessary in a shift valve arrangement of this type to provide an inhibitor valve for inhibiting a downshift at speeds that are undesirably high. It is impossible to accomplish a shift to the lowest speed ratio until the 2–3 shift valve conditions the mechanisms first for intermediate speed ratio operation.

A main regulator valve for the control system is identified generally by reference character 334. It includes a multiple land valve spool 336 having spaced valve lands 338, 340 and 342. These valve lands are situated slidably within a valve chamber 344 having spaced internal valve lands. Valve land 340 is urged in a left-hand direction by a valve spring 346 which is seated upon a valve seat 348.

Control pressure in passage 234 acts upon the left hand end of the valve land 338 and is distributed therethrough through a restricted branch passage 350. Passage 234 communicates with the chamber 344 adjacent valve land 340. Land 340 establishes controlled communication between passage 234 and the low pressure passage 232 and regulates the effective pressure in passage 234 at a valve that is dependent upon the calibration of spring 346.

A throttle boost valve plunger is shown at 352. It is slidably situated within one end of the valve chamber 344. A pin 354 transfers the force of valve plunger 352 to the valve spool 336 as throttle pressure is caused to act upon the right hand end of valve plunger 352. Pressure is distributed to the valve plunger 352 through a branch passage 356 which communicates with throttle pressure passage 320. Thus as pressure in passage 356 increases upon an increase in engine torque demand, the regulator valve will maintain a higher regulated pressure thereby maintaining clutch and brake capacity to accommodate the higher engine torque.

During reverse drive operation, it is necessary to provide a boost in line pressure to maintain the reverse brake capacity. This is accomplished by pressurizing prassage 358 or the manual valve moves to the R position. Passage 358 in turn communicates with valve chamber 344 at the right hand end of the valve spool 336. The pressure force thus created augments the force of the spring 346 to provide increased control presssure.

A throttle pressure signal in passage 320 is obtained by means of a throttle valve which is identified generally by reference character 360. This valve includes a valve spool 362 having multiple valve lands 364 and 366. It is slidably situated within a valve chamber 368. Spool 362 is urged in a left hand direction by a throttle valve spring 370 which acts upon a throttle valve spool 372 having spaced valve lands 374 and 376.

Control pressure from passage 234 is distributed to the chamber 368 through a branch passage 378. Passage 320 communicates with chamber 368 through a branch passage 380. Communication between passage 378 and passage 380 is controlled by valve land 376. As the force of spring 370 increases, the degree of communication increases. At the same time the degree of communication between passage 380 and exhaust port 382 decreases which results in a higher pressure in passage 320.

A throttle pressure feed back passage is shown at 384, and the pressure distributed to the right hand end of land 376 through passage 384 causes a regulating action.

Upon an increase in engine torque demand, it will be apparent that the pressure in passage 320 will increase. Thus pressure in passage 320 is an indicator of engine torque demand.

Kickdown pressure passage 332 normally is vented through an exhaust port 384 which communicates with the valve chamber 368. A stop 386 is carried by a valve body at a location adjacent valve land 364. When the valve spool 362 assumes the position shown, stop 386 is engaged. Thus the throttle valve system can be calibrated without providing a complicated vehicle throttle linkage adjustment as in the case of conventional automatic power transmission mechanisms. It is possible to hold the dimension between the internal valve lands of the chamber 368 and the surface of stop 386 to very close tolerances. A slight spring load in the spring 370 will cause the throttle valve to assume its proper calibrated position against the stop 386 regardless of any maladjustment of the vehicle engine throttle linkage.

Spool 362, of course, is connected to the engine throttle and moves upon movement of the engine throttle.

The spool 362 closes port 384 upon movement of the engine throttle to an advanced setting. At the same time passage 332 is caused to communicate with a branch passage 388 which normally is blocked by the land 366. As the throttle valve spool assumes the wide open throttle position, the magnitude of the pressure in passage 320 is approximately equal to line pressure. Thus line pressure is caused to pass into passage 332 and this same pressure is made available to the chamber 368 on the right hand side of land 366 through a branch passage 390. This introduces a so-called pressure detent feel which is received by the vehicle operator. The operator then can anticipate when the transmission will be conditioned for a forced throttle downshift. This feel is maintained during the time that the transmission mechanism assumes a downshift condition.

Upon movement of the 2–3 shift valve downwardly, passage 324 is pressurized as it is brought into communication with passage 328 and as communication with port 327 is interrupted. Passage 324 communicates with a passage 392 which in turn extends to the release side of the brake servo 258. A one-way ball check valve 394 is introduced in the passage 392 to permit free distribution of pressure to the release side of the servo 258. As both sides of the servo 258 become pressurized, the brake band 146 becomes released.

Upon a downshift, it is desirable to delay the rate of release of the band 146. This is accomplished by introducing a by-pass passage 396. This by-pass passage includes a check valve plate 398 which is situated within a valve chamber 400. It normally is urged to a closed position by a valve spring 402. A flow restricting orifice 404 is provided in the plate 398. As the 2–3 shift valve is conditioned for a down-shift, the fluid on the release side of the servo 258 then must be exhausted through the passage 396. If the downshift occurs under advanced throttle settings, it is desirable to provide a rather rapid application of the band 146. Under these conditions, the pressure in passage 256 is higher by reason of the augmentation in the control pressure that is provided by the main regulator valve. Thus the plate 398 will be unseated against the opposing influence of spring 402. This will permit a rapid discharge of the fluid on the release side of the servo 258, thereby permitting rapid application of the band 146 under high speed conditions.

The minimum pressure that is maintained on the release side of the servo 258 under advance throttle downshifts at slower speeds is maintained at a higher value by the plate 398 because of the relatively lower magnitude of the pressure in passage 256. This is desirable since a relatively slow rate of application of the band 146 is desired under these conditions.

The disc valve plate 398 will maintain at all times a pressure on the release side of the servo 258 that is greater than the pressure in the direct drive clutch servo 322 on a downshift. By varying the calibration of the spring 402, the differential in pressure between the release side of the servo 258 and the pressure in servo 322 can be controlled. After clutch pressure has fallen to zero p.s.i., the orifice in the disc valve plate 398 will permit a controlled fall-off of the residual pressure maintained in the brake servo release passage. Thus a smooth downshift is assured.

On a minimum throttle downshift, it also is desired to reduce the rate of application of the brake band 146. The downshift control valve is capable of achieving this result since under these conditions the pressure in passage 256 is relatively low and therefore will not force the oil rapidly from the release side of the servo 258. As the release side of the servo 258 is exhausted, the entire flow then must pass through the orifice 404.

When the manual valve spool 238 assumes the reverse drive position R, port 252 is blocked and pressure is distributed from passage 250 directly to passage 406. This passage in turn communicates with passage 358 which extends to the reverse brake servo 408. The other servos 322, 286 and 258 are released since they are all exhausted through their respective exhaust flow paths.

Hill brake operation is achieved by adjusting the manual valve to the HB position. This conditions the mechanism for torque delivery from the driven shaft to the engine.

Sustained operation in the low speed ratio is possible if the manual valve is shifted to the L position. The shift valves then are ineffective to provide automatic upshifts.

Having thus described a preferred embodiment of our invention, what we claim and desire to secure by U.S. Letters Patent is:

1. In a power transmission mechanism capable of delivering driving torque from a driving member to a driven member, a hydrokinetic unit having an impeller and a turbine situated in toroidal fluid flow relationship, the impeller being connected to said driving member, a planetary gear assembly, overrunning coupling means for connecting said turbine to a first power input element of said gear assembly, first selectively engageable clutch means for connecting said driving member directly to another element of said gear assembly, reaction brake means for anchoring portions of said gear assembly to provide a driving torque reaction, and second selectively engageable clutch means for connecting said turbine to said first element of said gear system which, when both selectively engageable clutch means are engaged, is conditioned substantially for 1:1 speed ratio operation, said reaction brake means including a rotatable drum that is connected to separate reaction elements in each of said gear units, one reaction element accommodating torque reaction during low speed ratio operation and the other reaction element providing torque reaction during intermediate speed ratio operation, the connection between said brake drum and said one reaction element comprising a spring damper assembly including spring elements forming a yieldable cushioning connection between said one reaction element and said brake drum.

2. In a power transmission mechanism adapted to deliver driving torque from a driving member to a driven member, a hydrokinetic unit comprising an impeller and a turbine disposed in toroidal fluid flow relationship, said impeller being connected to said driving member, a pair of simple planetary gear units, each gear unit comprising a sun gear, a ring gear, a carrier and planet gears rotatably mounted upon said carrier in meshing engagement with said sun and ring gears, each carrier being connected to said driven member, overrunning coupling means for connecting said turbine to the sun gear of a first of said gear units, selectively engageable low-and-intermediate brake means for anchoring the ring gear of said first gear unit and the sun gear of said second gear unit, a yieldable spring connection between the sun gear of said second gear unit and the ring gear of said first gear unit whereby inertia forces on the sun gear of said second gear unit upon application of said brake means are cushioned, first selectively engageable friction clutch means for connecting said driving member to the ring gear of said second gear unit, and second selectively engageable clutch means for connecting said turbine to the sun gear of said first gear unit to establish high speed ratio operation when said first clutch means is engaged whereby said overrunning coupling means is bypassed as regenerative torque is delivered through said hydrokinetic unit, the torque delivery path from said driving member to said driven member during operation with both clutch means engaged being partly hydrokinetic and partly mechanical.

3. A power transmission mechanism for delivering driving torque from a driving member to a driven member comprising a hydrokinetic unit and two simple planetary gear units, said hydrokinetic unit comprising a bladed impeller and a bladed turbine disposed in toroidal fluid flow relationship, each planetary gear unit comprising a sun gear, a ring gear, a carrier and planet pinions rotatably journaled upon said carrier in meshing engagement with said sun gear and said ring gear, separate housing portions for enclosing said gear units and said hydrokinetic unit, three concentric torque delivery shafts extending in the direction of a common axis for said hydrokinetic unit and said gear units and situated intermediate said housing portions, the outermost shaft being connected to said driven member, over-running coupling means for establishing a one-way driving connection between said turbine and the intermediate one of said shafts, first selectively engageable clutch means for establishing a positive, releasable, torque transmitting connection between said turbine and said intermediate shaft, means for establishing a direct mechanical connection between said impeller and the central one of said shafts, said impeller being connected to said driving member, said intermediate shaft being connected to the sun gear of a first of said gear units, second selectively engageable clutch means for connecting said central shaft to the ring gear of the other of said gear units, selectively engageable brake means for anchoring the ring gear of said first gear unit and the sun gear of said other gear unit, the carrier of each gear unit being connected to said outermost shaft, said brake means being engaged during low speed ratio operation and during intermediate speed ratio operation, said second clutch means being engaged during intermediate speed ratio operation, and said first clutch means being engaged during high speed ratio operation together with said second clutch means whereby torque is delivered regeneratively through said hydrokinetic unit to establish a torque delivery path between said driving member and said driven member that is partly hydrokinetic and partly mechanical.

4. A power transmission mechanism for delivering driving torque from a driving member to a driven member comprising a hydrokinetic unit and two simple planetary gear units, said hydrokinetic unit comprising a bladed impeller and a bladed turbine disposed in toroidal fluid flow relationship, each planetary gear unit comprising a sun gear, a ring gear, a carrier and planet pinions rotatably journaled upon said carrier in meshing engagement with said sun gear and said ring gear, separate housing portions enclosing said gear units and said hydrokinetic unit, three concentric torque delivery shafts extending in the direction of a common axis for said hydrokinetic unit and said gear units and situated intermediate said housing portions, the outermost shaft being connected to said driven member, overrunning coupling means for establishing a one-way driving connection between said turbine and the intermediate one of said shafts, first selectively engageable clutch means for establishing a positive releasable torque transmitting connection between said turbine and said intermediate shaft, means for establishing a direct mechanical connection between said impeller and the central one of said shafts, said impeller being connected to said driving member, said intermediate shaft being connected to the sun gear of a first of said gear units, second selectively engageable clutch means for connecting said central shaft to the ring gear of the other of said gear units, selectively engageable brake means for anchoring the ring gear of said first gear unit and the sun gear of said other gear unit, the carrier of each gear unit being connected to said outermost shaft, said brake means being engaged during low speed ratio operation and intermediate speed ratio operation, said second clutch means being engaged during intermediate speed ratio operation and said first clutch means being engaged during high speed ratio operation together with said second clutch means whereby torque is delivered regeneratively through said hydrokinetic unit to establish a torque deliver path between said driving member and said driven member that is partly hydrokinetic and partly mechanical, said second clutch means and said brake means being situated entirely within the housing portion that encloses said gear units, and said first clutch means being enclosed entirely within said hydrokinetic unit.

5. A power transmission mechanism for delivering driving torque from a driving member to a driven member comprising a hydrokinetic unit and two simple planetary gear units, said hydrokinetic unit comprising a bladed impeller and a bladed turbine disposed in toroidal fluid flow relationship, each planetary gear unit comprising a sun gear, a ring gear, a carrier and planet pinions rotatably journaled upon said carrier in meshing engagement with said sun gear and said ring gear, separate housing portions enclosing said gear units and said hydrokinetic unit, three concentric torque delivery shafts extending in the direction of a common axis for said hydrokinetic unit and said gear units and situated intermediate said housing portions, the outermost shaft being connected to said driven member, overrunning coupling means for establishing a one-way driving connection between said turbine and the intermediate one of said shafts, first selectively engageable clutch means for establishing a positive, releasable, torque transmitting connection between said turbine and said intermediate shaft, means for establishing a direct mechanical connection between said impeller and the central one of said shafts, said impeller being connected to said driving member, said intermediate shaft being connected to the sun gear of a first of said gear units, second selectively engageable clutch means for connecting said central shaft to the ring gear of the other of said gear units, selectively engageable brake means for anchoring the ring gear of said first gear unit and the sun gear of said other gear unit, the carrier of each gear unit being connected to said outermost shaft, said brake means being engaged during low speed ratio operation and during intermediate speed ratio operation, said second clutch means being engaged during intermediate speed ratio operation and said first clutch means being engaged during high speed ratio operation together with said second selectively engageable clutch means whereby torque is delivered regeneratively through said hydrokinetic unit to establish a torque delivery path between said driving member and said driven member that is partly hydrokinetic and partly mechanical, said brake means comprising a rotatable brake drum connected directly to the ring gear of said first gear unit, and a yieldable spring connection between the sun gear of said other gear unit and said brake drum whereby the reaction forces established during application of said brake means are absorbed.

6. A power transmission mechanism for delivering driving torque from a driving member to a driven shaft comprising a hydrokinetic unit and two simple planetary gear units, said hydrokinetic unit comprising a bladed impeller and a bladed turbine disposed in toroidal fluid flow relationship, each planetary gear unit comprising a sun gear, a ring gear, a carrier and planet pinions rotatably journaled upon said carrier in meshing engagement with said sun gear and said ring gear, separate housing portions enclosing said gear units and said hydrokinetic unit, three concentric torque delivery shafts extending in the direction of a common axis for said hydrokinetic unit and said gear units and situated intermediate said housing portions, the outermost shaft being drivably connected to said driven shaft, the latter extending in a direction transverse to said common axis, overrunning coupling means for establishing a one-way driving connection between said turbine and the intermediate one of said shafts, first selectively engageable clutch means for establishing a positive releasable torque transmitting connection between said turbine and said intermediate shaft, means for establishing a direct mechanical connection between said impeller and the central one of said shafts, said impeller being connected to said driving member, said intermediate shaft being connected to the sun gear of a first of said gear units, selectively engageable clutch means for connecting said central shaft to the ring gear of the other of said gear units, second selectively engageable brake means for anchoring the ring gear of said first gear unit and the sun gear of said other gear unit, the carrier of each gear unit being connected to said outermost shaft, said brake means being engaged during low speed ratio operation and intermediate speed ratio operation, said second clutch means being engaged during intermediate speed ratio operation and said first clutch means being engaged during high speed ratio operation together with said second clutch means whereby torque is delivered regeneratively through said hydrokinetic unit to establish a torque delivery path between said driving member and said driven member that is partly hydrokinetic and partly mechanical, said second selectively engageable clutch means and said brake means being situated entirely within the housing portion that encloses said gear units, said first selectively engageable clutch means being enclosed entirely within said hydrokinetic unit, said brake means comprising a rotatable brake drum connected directly to the ring gear of said first gear unit, and a yieldable spring connection between the sun gear of said other gear unit and said brake drum whereby the reaction forces established during application of said brake means are absorbed.

References Cited by the Examiner
UNITED STATES PATENTS

| | | | |
|---|---|---|---|
| 2,395,459 | 2/1946 | Carnagua | 74—759 |
| 2,919,597 | 1/1960 | Borman. | |
| 3,003,368 | 10/1961 | Winchell. | |
| 3,057,225 | 10/1962 | Snyder | 74—688 |
| 3,096,666 | 7/1963 | Christenson et al. | |

DAVID J. WILLIAMOWSKY, *Primary Examiner.*

DON A. WAITE, *Examiner.*

T. C. PERRY, *Assistant Examiner.*